US009143354B2

(12) United States Patent
Delattre et al.

(10) Patent No.: US 9,143,354 B2
(45) Date of Patent: Sep. 22, 2015

(54) METHOD AND SYSTEM FOR TRANSMITTING MULTIMEDIA STREAMS

(71) Applicant: THALES, Neuilly sur Seine (FR)

(72) Inventors: Michel Delattre, Colombes Cedex (FR); Eric Blanchard, Colombes Cedex (FR)

(73) Assignee: Thales, Neuilly sur Seine (FR)

( * ) Notice: Subject to any disclaimer, the term of this patent is extended or adjusted under 35 U.S.C. 154(b) by 220 days.

(21) Appl. No.: 13/632,978

(22) Filed: Oct. 1, 2012

(65) Prior Publication Data

US 2013/0031156 A1    Jan. 31, 2013

Related U.S. Application Data

(63) Continuation of application No. PCT/FR2011/050748, filed on Apr. 1, 2011.

(30) Foreign Application Priority Data

Apr. 2, 2010   (FR) ...................................... 10 01388

(51) Int. Cl.
| | |
|---|---|
| *G06F 15/167* | (2006.01) |
| *H04L 12/28* | (2006.01) |
| *H04L 12/54* | (2013.01) |
| *H04L 12/701* | (2013.01) |
| *H04L 12/721* | (2013.01) |
| *H04L 12/725* | (2013.01) |
| *H04L 12/801* | (2013.01) |
| *H04L 12/911* | (2013.01) |

(52) U.S. Cl.
CPC ............ *H04L 12/5695* (2013.01); *H04L 45/00* (2013.01); *H04L 45/12* (2013.01); *H04L 45/302* (2013.01); *H04L 47/10* (2013.01); *H04L 47/825* (2013.01); *H04L 47/826* (2013.01)

(58) Field of Classification Search
USPC .......................................... 370/389; 709/216
See application file for complete search history.

(56) References Cited

U.S. PATENT DOCUMENTS

| | | | |
|---|---|---|---|
| 6,628,649 B1* | 9/2003 | Raj et al. ........................ | 370/360 |
| 2001/0019554 A1* | 9/2001 | Nomura et al. ................ | 370/389 |
| 2003/0228093 A1* | 12/2003 | Notani ............................ | 385/24 |
| 2007/0070995 A1* | 3/2007 | Pelletier et al. ............... | 370/389 |
| 2010/0246587 A1* | 9/2010 | Schutz et al. .................. | 370/401 |

FOREIGN PATENT DOCUMENTS

| | | |
|---|---|---|
| EP | 1089517 | 4/2001 |
| FR | 2905046 | 2/2008 |
| FR | 2914523 | 10/2008 |

OTHER PUBLICATIONS

International Search Report for International Application No. PCT/FR2011/050748.

* cited by examiner

*Primary Examiner* — Emmanuel L Moise
*Assistant Examiner* — Mahran Abu Roumi
(74) *Attorney, Agent, or Firm* — Knobbe Martens Olson & Bear LLP

(57) ABSTRACT

A method of transmitting data streams of a multimedia session between a first and a second terminal through a telecommunication network comprising a network core is disclosed. In one aspect, the method includes the determination by border modules, points of access to the network core, of the routing topology and of the state of the links of the network. The method further includes the determination of parameters of the session, the selecting of input and output border modules of the network core for the streams, the predetermination of a path, between the input and output border modules for all the streams of the session, the setting up of resources along the path, the defining of routing rules at the routing modules situated along the path, and the transmission of the streams only by the path.

12 Claims, 2 Drawing Sheets

METHOD AND SYSTEM FOR TRANSMITTING MULTIMEDIA STREAMS

CROSS REFERENCE TO RELATED APPLICATIONS

This application is a continuation and claims benefit under 35 U.S.C. §§120 and 365 of PCT Application No. PCT/FR2011/050748, entitled "METHOD AND SYSTEM FOR TRANSMITTING MULTIMEDIA STREAMS," filed Apr. 1, 2011, which is herein incorporated by reference in its entirety and which claims priority to French Application No. 10 01388, entitled "METHOD AND SYSTEM FOR TRANSMITTING MULTIMEDIA STREAMS," filed on Apr. 2, 2010, which is incorporated herein by reference in its entirety.

BACKGROUND

1. Field of the Invention

The invention relates to a method and a system for transmitting at least one data stream of a multimedia session through a distributed telecommunications network comprising at least one network core comprising a plurality of nodes interconnected by a plurality of links, each node of the network having a routing module, the session being established between a first terminal and at least one second terminal outside the network core, and the network core also comprising at least two border modules, making up points of access to the network core for the first and second terminals.

2. Description of the Related Technology

In the rest of the description and in the claims, "terminal" refers to equipment capable of sending and/or receiving data, whether it involves a user terminal or security equipment, acting as a proxy for terminals deployed within a protected perimeter and only accessing networks outside the perimeter through that security equipment.

Embodiments in particular apply to the real-time transmission of multimedia data on a communication network using the IP protocol, the data transmission in the network core being done using radio links.

Such a network comprises variable throughput links, in particular due to the variation of the propagation channels, for example due to weather conditions, and the sharing of spectral resources, consisting of dynamically allocating the spatial resources as a function of instantaneous needs. The radio resources are thus limited, variable, and costly.

Furthermore, real-time multimedia data transmission is demanding in terms of quality of service. In fact, such data is sent in the form of isochronous streams, the data packets of which are sent by a transmitting terminal at regular time intervals. These packets must be able to be received by a receiving terminal at regular time intervals for them to be usable.

Real-time multimedia stream transmission also requires monitoring several parameters, such as the bandwidth, the transit time, and the jitter, i.e. the variation in transmission timeframes of the packets on the network. Monitoring of these parameters throughout the length of the session defines the quality of service (QoS), which for the receiving terminal is expressed by a quality of experience (QoE).

"All IP" networks, which make it possible to have all of the telecommunications services converge on a same infrastructure, are not natively capable of providing such quality of service, in particular because they are based on individual data packet processing mechanisms, and not streams of packets.

Several mechanisms are therefore generally used to monitor the quality of service of sessions on such networks. In particular, the available bandwidth may be monitored by implementing a connection admission control (CAC), which makes it possible to determine before the transmission of streams whether the bandwidth available on the network is sufficient to transmit those streams with the required quality of service, without affecting the quality of service of other flows transmitted on the network, and to reject flows that would be in excess.

However, the admission control does not always guarantee that the requested bandwidth will be maintained during transmission of the stream, in particular when that transmission is done on wireless networks, the links of such networks often having a variable throughput. Thus, admission control does not make it possible to guarantee the availability of the bandwidth for the transmission of an entire stream, and decreasing the available bandwidth of a variable throughput link, on which streams admitted on that link at the end of an admission control are transmitted, may cause a loss of packets from those streams.

In order to guarantee the available bandwidth for transmitting streams, the admission control may be coupled with a resource reservation protocol. For example, the RSVP (Resource reSerVation Protocol) is a protocol that allows the recipient of data streams to request a certain quality of service (for example, the timeframe or bandwidth) through the network. This signaling protocol makes it possible to allocate the bandwidth dynamically: it is used by "real-time" applications to reserve the necessary resources at the routers for the necessary bandwidth to be available during transmission.

Furthermore, session control mechanisms make it possible to initialize, modify, and end multimedia sessions. For example, the session initiation protocol (SIP) makes it possible to authenticate and locate the participants in the multimedia session, the characteristics of the session being described using the SDP (Session Description Protocol).

The protocols used to transmit data streams generally use a layer-based architecture, each layer being responsible for providing one or more specific services to the layer above it, and communications being done only between adjacent layers.

However, in wireless networks, this organization is not optimal, the properties of the various layers being dependent on one another. In order to meet the quality of service requirements for multimedia sessions, the communication system must be able to adapt dynamically to traffic situations and network conditions, this need not being able to be met by the traditional protocol network architecture.

The emergence of a new concept, called "cross-layering," allowing the layer-based protocol architecture to be violated, makes it possible to improve the transmission performance in wireless networks and ensure better quality of service for multimedia sessions. Thus, antenna systems, spectral distributions, modulation and encoding functions, information routing along multiple paths, and end-to-end optimization functions all adapt continuously as a function of the application needs and available capacity of the network.

Furthermore, the stream routing, admission control, and session control mechanisms are generally implemented separately, and do not allow the rapid deployment of networks using adaptive transmission systems.

Known from document WO/2008/125437 is a method for routing data streams in a network comprising multi-topology routers, each of the topologies being associated with a particular metric (for example timeframe, available throughput, bandwidth, etc.), in which the routing and reservation mechanisms are coupled. According to this method, a variation in the usable throughput of a link of the network causes a change in a metric, that change being taken into account to route the data streams.

This method has several drawbacks. In particular, it does not make it possible to optimize the network resources, and the variability of the throughputs of the links may cause signaling and processing overloads for the routers of the network. Furthermore, knowledge of the status of the network is not used during the negotiation of a service for a session, and the routing policies cannot be selected on a session-by-session basis.

SUMMARY OF CERTAIN ASPECTS OF THE INVENTION

The aim of the embodiments described herein is thus to improve transmission methods and consume less network resources during the phases for establishing and maintaining the session, to effectively guarantee the quality of service on the network and distribute the charges on the network.

In one aspect, a transmission method may include:

determination, by the border modules, of information relative to the routing topology and the status of the links of the network, necessary for the transmission of data streams of the session, determination, by a border module addressed by the first terminal, of parameters of the session comprising a length of the session and flow constraints for the streams of the session in the network core, selection, by the addressed border module, when the data streams must pass through the core of the network, of an input border module and an output border module of the network core for the streams, as a function of the stream flow constraints and the predetermined session parameters, and the information relative to the routing topology and the status of the links, predetermination of a path, from the input border module to the output border module, for all of the streams of the session, through the network core, as a function of the flow constraints of the streams and the information relative to the routing topology and the status of the links, and as a function of optimization objectives for the network core, establishment of the resources necessary to satisfy the flow constraints along the path and the optimization objectives, and definition of routing rules with routing modules situated along the path, and transmission of the streams of the session only using the predetermined path.

Thus, this transmission method makes it possible to negotiate a stream transfer service for each session that takes into account the status of the links of the network, and to determine an optimal path for all of the streams, ensuring a quality of service for the entire duration of the session, while optimizing the network resources, i.e. minimizing the resources used by the session. This method also allows coupling between the application, network and data link layers of the network architecture.

According to other aspects, the transmission method includes one or more of the following features:

the step for determination by the border modules of information relative to the routing topology and the status of the links of the network comprises the determination by the routing modules of the information and the transmission of the information from the routing modules to the border module;

the transmission method also comprises a step for marking the streams so that they follow the predetermined path;

the step for determining the flow constraints of the streams comprises determining the priority of the session relative to other sessions, and the step for establishing the necessary resources comprises preempting resources along the path, as a function of the priority of the session;

the step for establishing the resources and defining the routing rules comprises reserving resources along the path, in the network core, prohibiting them from being used by other sessions throughout the entire length of the session;

the method also comprises a step for compressing headers of the packets of the streams of the session, before they are transmitted in the network core, and a step for decompressing those headers, after they are transmitted in the network core.

An embodiment also relates to a system for transmitting at least one data stream of a multimedia session through a distributed telecommunications network comprising at least one network core comprising a plurality of nodes interconnected by a plurality of links, the session being established between a first terminal and at least one second terminal outside the network core, the system comprising at least two border modules on the border of the network core, making up points of access to the network core for the first and second terminals, and a routing module in each node of the network.

the border modules comprises a mechanism for determining information relative to the routing topology and the status of the links of the network, necessary for the transmission of data streams of the session, the border modules comprise mechanisms for determining parameters of the session comprising a length of the session, and flow constraints of the streams of the session in the network core, when they are addressed by the first terminal, when the data streams must pass through the network core, the border modules comprise mechanisms for selecting an input border module and an output border module of the network core for the streams, as a function of the stream flow constraints and the predetermined session parameters, and the information relative to the routing topology and the statuses of the links, the system comprises a mechanism for predetermining a path, from the input border module to the output border module, for all the streams of the session, through the network core, as a function of the flow constraints of the streams and the information relative to the routing topology and the status of the links, and as a function of optimization objectives of the network core, the system comprises a mechanism for establishing the resources necessary to satisfy the flow constraints and the optimization objectives along the path and to define routing rules with the routing modules situated along the path, and the system comprises a mechanism for transmitting the streams of the session only using the predetermined path.

According to other aspects, the transmission system includes one or more of the following features:

the routing modules also include a mechanism for determining the information relative to the routing topology and the status of the links of the network, and for transmitting that information to the border modules;

the transmission system comprises a mechanism for marking the streams so that they follow the predetermined path;

the mechanism for determining the flow constraints of the streams of the session comprise a mechanism for determining the priority of the session relative to other sessions, and the mechanism for establishing the resources necessary to satisfy the flow constraints along the path comprises a mechanism for preempting the resources along the path, as a function of the priority of the session;

the mechanism for establishing the necessary resources comprises a mechanism for reserving the resources along the path, in the network core, and for prohibiting them from being used by other sessions throughout the entire duration of the session; and the transmission system comprises a mechanism for compressing headers of the packets of the streams of the session, before they are transmitted in the network core, and a mechanism for decompressing the headers after they are transmitted in the network core.

BRIEF DESCRIPTION OF THE DRAWINGS

The invention will be better understood in light of an embodiment that will now be described in reference to the appended figures, in which.

DETAILED DESCRIPTION OF CERTAIN INVENTIVE EMBODIMENTS

Figure 1:
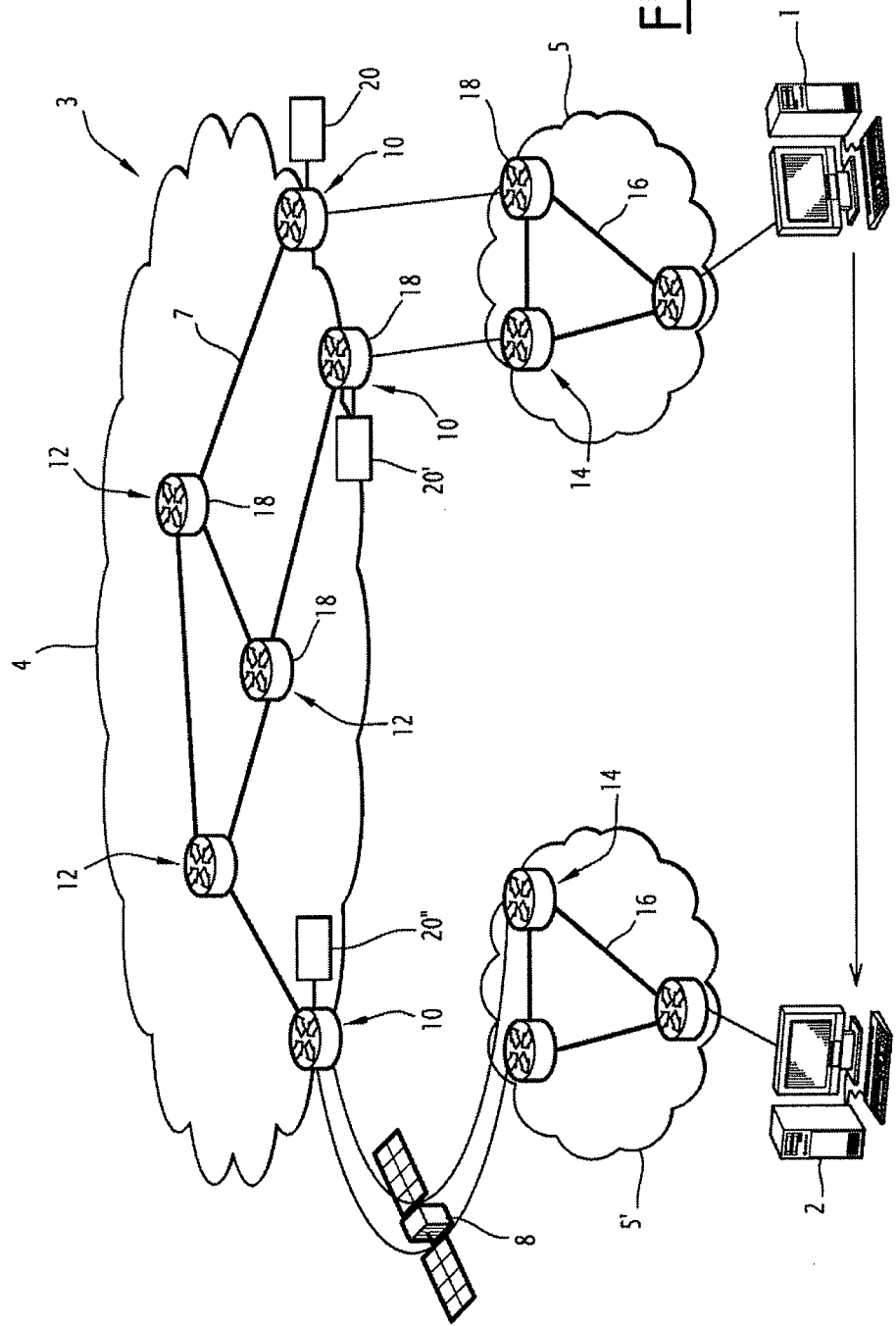
FIG. 1 is a diagram illustrating a communication network adapted to implement the method according to an embodiment.

FIG. 1 shows the overall architecture of a system in which the method according to embodiments can be implemented.

The system comprises a requesting terminal 1, a requested terminal 2, and a communication network 3. These requesting 1 and requested 2 terminals are for example multimedia equipment, or security equipment such as encoders connected to a local network and protecting the local network.

The requesting terminal 1 can request the establishment of a multimedia session and the exchange of data, through the network 3, with the requested terminal 2.

The communication network 3 is a distributed network, i.e. not comprising a central decision-making organ, organized in three levels: a network core 4, access networks 5, 5', and serving networks, not shown.

The network core 4 is a mesh network, including a plurality of nodes 10, 12, interconnected by a mesh of links 7, with variable throughputs. These links 7 use various transmission technologies and comprise optical links, land-based radio links, and radio links on a satellite infrastructure. In this way, the characteristics of these links, for example their point-to-point or multipoint connectivity, transmission time, and stability of that time, vary from one link to the next.

Among the nodes 10, 12 of the network core 4, the border nodes 10, points of entry into the network core 4, and the internal nodes 12 can be distinguished. The internal nodes 12 are intermediate nodes, not connected to the access networks 5, 5', which make it possible to increase meshing for more robustness within the network core 4, and to relay the transmitted data on the links 7.

The access networks 5, 5' also have nodes 14 connected by links 16, and making it possible to connect the requesting 1 and requested 2 terminals to the network core 4. Some of these links 16 use transmission technologies on a satellite infrastructure 8.

All of the nodes 10, 12 and 14 of the network comprise a routing module 18. Furthermore, the border nodes 10 also comprise a border module 20, 20', 20". A distinction is thus made between the nodes 10, 12, 14, material devices arranged at each end of the links 7, 16, and the routing 18 and border 20, 20', 20" modules, software agents supplying communication services.

Each of the routing modules 18 comprises a mechanism for determining the routing topology of the network 3 and the detailed statuses of the links 7, 16 of the network, and a mechanism for transmitting that information to the border modules 20, 20', 20".

Each routing module 18 also comprises a mechanism for receiving data streams transmitted by a neighboring routing module, and for routing those data streams toward another neighboring routing module, so that those data streams follow a predetermined path.

The border modules 20, 20', 20" comprise mechanisms for negotiating service parameters for a session, requested by the requesting terminal 1 when the session is initiated, to estimate the length of the session, and to define flow constraints for the streams of the session as a function of those negotiated parameters, the estimated length of the session, and the routing topology of the network 3 and detailed statuses of the links 7, 16 of the network.

The border modules 20, 20', 20" also comprise mechanisms for selecting two border modules 20', 20", respectively the input node and output node of the network core 4, for the streams of a session as a function of flow constraints determined for the streams of the session.

Furthermore, the border modules 20, 20', 20" can determine a path between the requesting terminal 1 and the requested terminal 2, passing through the input and output for the modules previously selected, in particular as a function of the information on the topology and the status of the links on the network 3.

The border modules 20, 20', 20" also comprise mechanisms for requesting the establishment of resources on the links of the network core and the access links making up the determined path, so as to satisfy the flow constraints of the streams and optimization criteria of the network.

Figure 2:
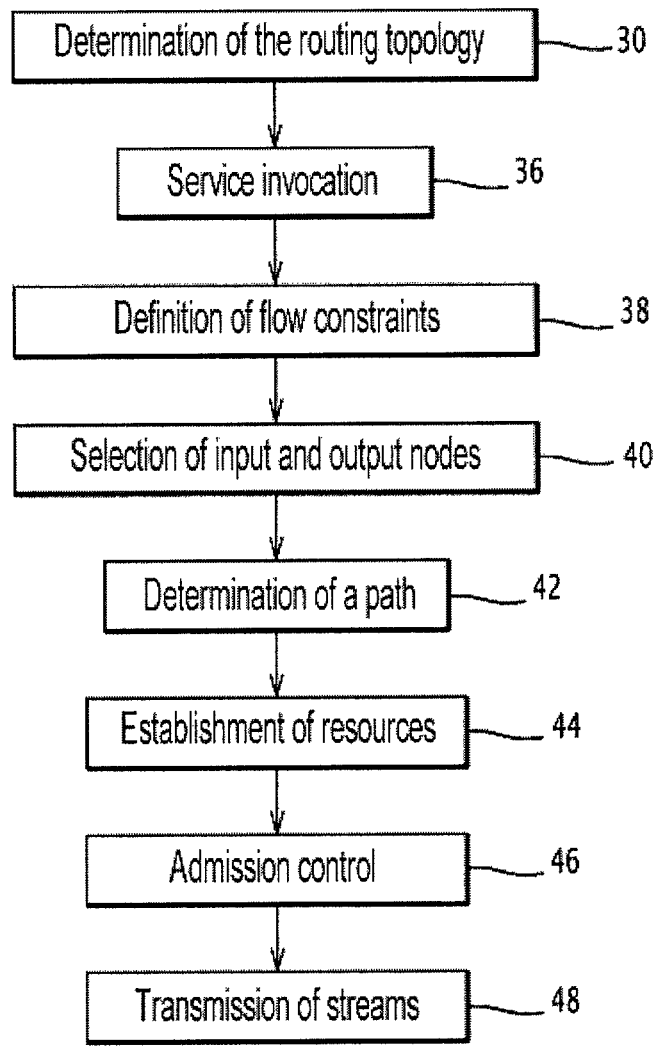
FIG. 2 is a flowchart illustrating the implementation of a transmission method according to an embodiment.

The transmission method, shown diagrammatically in FIG. 2, is based on knowing the statuses and tendencies of the links of the network 3 to organize the optimal flow of the streams of a session when that session is initiated.

Thus, during a step 30 carried out continuously, the routing modules 18 determine the routing topology of the network 3, identifying the nodes 10, 12, 14 and the links 7, 16 of the network, those links being characterized as core nodes 10, 12 and access nodes 14. The routing modules 18 also collect the detailed statuses of the links of the network, making it possible to determine the availability of those links. These statuses of the links, obtained by the routing modules 18 from information produced by reservation and supervision algorithms for the exchanges between the nodes, distributed algorithms and applying the cross-layering principles, in particular take into account the transmission requests and reservations made on the links 7, 16, and the transmission timeframes and capacities of those links 7, 16, and in particular the variable capacities of the radio links of the network. These statuses of the links also comprise information relative to the risk level of those links in terms of security.

Advantageously, this step 30 is carried out using a link status routing protocol such as the OSPF-TE (Open Shortest Path First-Traffic Engineering) protocol, according to which the routing modules 18 together collect the statuses of the links and build the tree of all of the statuses in the network 3 from their point of view.

The routing modules 18 then send the border modules 20, 20', 20" the information relative to the network topology and the statuses of the predetermined links.

When the requesting terminal 1 wishes to initiate a multimedia system requiring a service guarantee with the requested terminal 2, in a step 36, it sends a request to invoke that service. Advantageously, this request is sent according to a call signaling protocol such as SIP signaling.

This request indicates the parameters of the service associated with the session, and in particular the recipient of the data, the type of data to be transmitted (audio or video data, for example), the codec used for the compression of that data, the priority level of the session, and the security level of the session. This request is sent via the access network 5 to any first border module 20, which negotiates those service parameters with the requesting terminal 1, in particular as a function of information received on the topology of the network 3 and the statuses of the links. This negotiation is one mechanism for allowing the requesting terminal 1 and the first border module 20 to agree on the quality of service level that the network must provide for the transmission of the streams of the session.

From these negotiated parameters, in a step 38, the first border module 20 defines flow constraints for the streams of the session, and estimates the length of that session. These flow constraints are technical parameters relative to the flow of the streams of the session, such as the maximum jitter and transfer time for the negotiated service to be guaranteed. The first border module 20 also defines the importance level of the session relative to other sessions invoked or in progress based on the negotiated priority level.

Then, during a step 40, the first border module 20 selects two border modules 20', 20", respectively input node into the network core and output node for the streams of the session, as a function of the topology of the network 3 and the status of the links on that network determined during the step 30, and as a function of the flow constraints of the streams of the session defined during step 38. These input and output border modules 20', 20" are for example the border modules closest to the access networks 5 and 5' by which the requesting terminal 1 and the requested terminal 2 access the network core 4.

The first border module 20 then reorients the session initialization request from the requesting terminal 1 to the selected input border module 20'.

The input border module 20' then continues initializing the session with the requesting terminal 1 and the output border module 20".

In a step 42, the input border modules 20', 20" then seek a path between the requesting terminal 1 and the requested terminal 2, passing through the input and output border modules 20', 20", as a function of the information on the topology and status of the links on the network, this path allowing the flow of the streams of the session according to the flow constraints defined in step 38. During the search for this path, the input and output border modules 20', 20" also take into account the overall policy regarding the network core 4, in particular in terms of security position and resource optimization of the network core 4.

Thus, as a function of the security level negotiated for the session, the predetermined path may be made up of high-security links, for example links to anti-jamming protection.

Furthermore, when determining this path, the border modules 20' and 20" optimize the resources of the network 3, from optimization criteria defined for the entire network 3. The optimization criteria evaluate a cost associated with each of the links of the network, depending on the status of those links, and during determination of the path, the border modules 20', 20" preferably select the links with the lowest costs that meet the flow constraints. These optimization criteria may in particular take into account the spectral responsivity of the links of the network, the border modules 20' and 20" then favoring links with the greatest spectral responsivity when determining the path.

Once the path is determined, during a step 44, the border modules 20' and 20" request the establishment of resources on the links 7 of the network core and the access links 16 making up that path, so as to meet the flow constraints of the streams and the optimization criteria of the network. Advantageously, these resources are established using a reservation protocol of the RSVP-TE type, periodic signaling emitted by the border modules 20' and 20" indicating the rules for routing the streams of the session to each of the routing modules 18 situated along the path.

Furthermore, if the priority level of the session and the status of the links require it, the border modules 20' and 20" preempt resources, so as to free up resources used by other sessions of lower priority, and allocate them to the initiated session.

Furthermore, the border modules 20' and 20" require the establishment of mechanisms for IP header compression and decompression using the ROHC (RObust Header Compression) method. This compression method in fact makes it possible to increase the network's capacity to transmit useful information by reducing the header size of the transmitted packets. In fact, the IP headers generally make up a significant portion of multimedia data packets. For example, 60 bytes of IP header are necessary to transmit 20 bytes of audio data, according to the IPv6 protocol. Compressing the headers, which reduces the size of those headers from 60 bytes to 4 bytes, thereby makes it possible to reduce the resources used to transmit that data by a factor of four.

Then, in an admission control step 46, if the resources necessary for the flow of the streams of the session according to the negotiated constraints were able to be established, the input border module 20' admits the session, and signals that admission to the requesting terminal 1. However, if no path has been found for the flow of the streams, or if the necessary resources could not be established, the session is rejected. This admission control thus makes it possible to eliminate sessions for which the network cannot meet the constraints as early as possible.

The streams of the admitted session are then sent, in a step 48, between the requesting terminal 1 and the requested terminal 2, following only the path predetermined in step 42. Thus, contrary to routing protocols using packets, in which each data packet is processed individually, the method in accordance with an embodiment makes it possible to determine and reserve an optimal path for all of the streams of the session, that path not varying due to outside factors during transmission.

During the transmission of the flows of the session, the routing modules arranged along the predetermined path route the data packets following the routing rules defined in step 44. For the streams of that session to follow the predetermined path effectively, the streams must be able to be identified by the routing modules 18. To that end, mechanisms for marking the streams of the session are put in place. Advantageously, the packets of the streams of the session are marked when they are emitted by the requesting 1 and requested 2 terminals in the "Flow Label" field of their header, that field being provided allow easy identification of packets of the same session for which special processing by the routing modules 18 of the border nodes 10 is requested. The streams of the session are therefore easily identifiable, which allows the input and output border modules 20', 20" to control the characteristics of those streams throughout the entire duration of the session.

It will thus be understood from the preceding description how the transmission method in accordance with an embodiment makes it possible to guarantee a quality of service for all of the streams of a session, despite the variability of the throughput of the network links, and how this method makes it possible to optimize the resources of the network, according to multiple criteria that may be defined on a session-by-session basis.

It must nevertheless be understood that the example embodiment presented above is not limiting.

In particular, the determination of the status of the links and the topology of the network is not necessarily done using a link status routing protocol.

Furthermore, the routing modules may be based on the packet routing and routing principles of the MPLS (Multi-Protocol Label Switching) protocol, which is based on the allocation of labels to the data packets for switching of the packets.

According to another embodiment, the routing modules are based on multi-topology routing and routing principles, making it possible to select the topology best adapted to each negotiated service for that service.

More generally, embodiments are not limited to the routing, reservation, or signaling protocols cited in the described embodiment.

Furthermore, the requested terminal is not necessarily a single terminal, the session being able to be established between several terminals.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of transmitting at least one data stream of a multimedia session through a distributed telecommunications network comprising at least one network core comprising a plurality of nodes interconnected by a plurality of links, each node of the network having a routing module, the session being established between a first terminal and at least one second terminal outside the network core, and the network core also comprising at least two border modules, making up points of access to the network core for the first and second terminals, wherein the method comprises:
    determining, by the border modules, information relative to the routing topology and the status of the links of the network, necessary for the transmission of data streams of the session;
    determining, by a border module addressed by the first terminal, parameters of the session comprising a length of the session and flow constraints for the streams of the session in the network core;
    selecting, by the addressed border module, when the data streams must pass through the network core, of an input border module and an output border module of the network core for the streams, as a function of the stream flow constraints and the predetermined session parameters, and the information relative to the routing topology and the status of the links;
    predetermining a path, from the input border module to the output border module, for all of the streams of the session, through the network core, as a function of the flow constraints of the streams and the information relative to the routing topology and the status of the links, and as a function of optimization objectives for the network core;
    establishing resources necessary to satisfy the flow constraints along the path and the optimization objectives, and definition of routing rules with routing modules situated along the path; and
    transmitting the streams of the session only using the predetermined path.

2. The method of transmitting data streams of a multimedia session according to claim 1, wherein determining, by the border modules, information relative to the routing topology and the status of the links of the network comprises determining by the routing modules the information and transmitting the information from the routing modules to the border modules.

3. The method of transmitting data streams of a multimedia session according to claim 1, further comprising marking the streams so that they follow the predetermined path.

4. The method of transmitting data streams of a multimedia session according to claim 1, wherein determining the flow constraints of the streams comprises determining the priority of the session relative to other sessions, and wherein establishing the necessary resources comprises preempting resources along the path, as a function of the priority of the session.

5. The method of transmitting data streams of a multimedia session according to claim 1, wherein establishing the resources and defining the routing rules comprises reserving resources along the path, in the network core, and prohibiting them from being used by other sessions throughout the entire length of the session.

6. The method of transmitting data streams of a multimedia session according to claim 1, further comprising compressing headers of the packets of the streams of the session, before they are transmitted in the network core, and decompressing those headers, after they are transmitted in the network core.

7. A system for transmitting at least one data stream of a multimedia session through a distributed telecommunications network comprising at least one network core comprising a plurality of nodes interconnected by a plurality of links, the session being established between a first terminal and at least one second terminal outside the network core, the system comprising at least two border modules on the border of the network core, making up points of access to the network core for the first and second terminals, and a routing module in each node of the network, wherein:
    the border modules comprise a determination mechanism configured to determine information relative to the routing topology and the status of the links of the network, necessary for the transmission of data streams of the session;
    the border modules further comprise a second determination mechanism configured to determine parameters of the session comprising a length of the session, and flow constraints of the streams of the session in the network core, when they are addressed by the first terminal;
    the border modules further comprise a selection mechanisms, when the data streams must pass through the network core, configured to select an input border module and an output border module of the network core for the streams, as a function of the stream flow constraints and the predetermined session parameters, and the information relative to the routing topology and the statuses of the links;

the system further comprises a path determination mechanism configured to predetermine a path, from the input border module to the output border module, for all the streams of the session, through the network core, as a function of the flow constraints of the streams and the information relative to the routing topology and the status of the links, and as a function of optimization objectives of the network core;

the system further comprises a resource establishing mechanism configured to establish the resources necessary to satisfy the flow constraints and the optimization objectives along the path and to define routing rules with the routing modules situated along the path; and the system further comprises a transmitter configured to transmit the streams of the session only using the predetermined path.

8. The system for transmitting at least one data stream of a multimedia session according to claim 7, wherein the routing modules further comprises a determination mechanism configured to determine the information relative to the routing topology and the status of the links of the network, and configured to transmit that information to the border modules.

9. The system for transmitting at least one data stream of a multimedia session according to claim 7, further comprising a marking mechanism configured to mark the streams so that they follow the predetermined path.

10. The system for transmitting at least one data stream of a multimedia session according to claim 7, wherein the determination mechanism configured to determine the flow constraints of the streams of the session is configured to determine the priority of the session relative to other sessions, and wherein the resource establishing mechanism configured to satisfy the flow constraints along the path is further configured to preempt the resources along the path, as a function of the priority of the session.

11. The system for transmitting at least one data stream of a multimedia session according to claim 7, wherein the resource establishing mechanism is further configured to reserve the resources along the path, in the network core, and configured to prohibit them from being used by other sessions throughout the entire duration of the session.

12. The system for transmitting at least one data stream of a multimedia session according to claim 7, wherein the transmission system comprises a compression mechanism configured to compress headers of the packets of the streams of the session, before they are transmitted in the network core, and configured to decompress the headers after they are transmitted in the network core.

* * * * *